United States Patent [19]

Chenoweth et al.

[11] Patent Number: 4,582,349

[45] Date of Patent: Apr. 15, 1986

[54] PLASTICALLY DEFORMED SEALS IN DOWNHOLE TOOLS

[75] Inventors: David V. Chenoweth; David M. McStravick; Everett H. Smith, all of Houston, Tex.

[73] Assignee: Baker Oil Tools, Inc., Orange, Calif.

[21] Appl. No.: 384,839

[22] Filed: Jun. 4, 1982

[51] Int. Cl.[4] ............................................. F16L 15/00
[52] U.S. Cl. ................................. 285/332.3; 285/350; 285/355; 285/DIG. 18
[58] Field of Search ................. 285/332.2, 332.3, 355, 285/DIG. 18, 350, 349, 379, 336, 333, 334; 277/236, 189

[56] References Cited

U.S. PATENT DOCUMENTS

| | | | |
|---|---|---|---|
| 1,905,115 | 4/1933 | Lofgren | 285/332.3 X |
| 2,445,963 | 7/1948 | Montgomery | 285/379 X |
| 2,553,222 | 5/1951 | Wallgren et al. | 285/350 X |
| 2,563,515 | 8/1951 | Brown | 285/332.2 X |
| 3,298,718 | 1/1967 | Hansen | 285/336 |
| 3,467,413 | 9/1969 | Madrelle | 285/332.2 |
| 3,615,109 | 10/1971 | Brinda et al. | 285/332.2 |
| 3,618,989 | 11/1971 | Yoshinori | 285/DIG. 18 X |
| 3,831,951 | 8/1974 | Patel et al. | 285/379 X |

FOREIGN PATENT DOCUMENTS

| | | | |
|---|---|---|---|
| 143432 | 5/1920 | United Kingdom | 285/332.3 |
| 204900 | 10/1923 | United Kingdom | 285/332.3 |

Primary Examiner—Thomas F. Callaghan
Attorney, Agent, or Firm—Norvell & Associates

[57] ABSTRACT

A metal-to-metal fluid tight seal configuration formed between two abutting tubular members for use in subterranean oil and gas wells is disclosed. A metal-to-metal fluid tight seal is utilized in a shear release expansion joint assembly mounted by means of an anchor seal assembly in a conventional downhole packer. Sealing engagement is provided by plastic deformation of an annular seal ring between two abutting tubular members which are less ductile than the seal ring. In the preferred embodiment the metal-to-metal fluid tight seal is formed between abutting box and pin tubular members and the plastic deformation of the circular ring occurs as the ring is received within a groove in one of the abutting tubular members which has a dissimilar profile in comparison to the cross-section of the circular ring. Plastic deformation occurs as the box and pin members are rotationally threaded together and a continuous fluid tight seal is maintained along surfaces of both tubular members.

1 Claim, 6 Drawing Figures

PLASTICALLY DEFORMED SEALS IN DOWNHOLE TOOLS

BACKGROUND OF THE INVENTION

1. Field of the Invention

This invention relates to a metal-to-metal fluid tight seal configuration formed between two abutting threaded tubular members comprising a downhole member used in a subterranean oil and/or gas well.

2. Description of the Prior Art

In subterranean oil and/or gas wells fluid tight seals must be established between components used for the transmission of oil or gas from the producing formation to the surface of the well or for the injection of fluids into the well. The most common means of maintaining sealing integrity is to utilize polymeric seals between adjacent metallic members. Quite often these seals are of an elastomeric material and seals having a conventional O-ring configuration, a chevron configuration or a T-shaped configuration are often used in downhole assemblies. It is quite common to use an elastomeric O-ring seal to prevent leakage between two threaded tubular members or components. U.S. Pat. No. 2,980,451 discloses an extrudable member used to establish sealing integrity between two threaded members.

Another means of maintaining a metal-to-metal seal between tubular components is to employ a fluid tight threaded connection. These conventional fluid tight threaded connections are commonly referred to as a premium threaded connections and employ a special thread contour such that mating threads are always forming a stressed metal-to-metal circumferentially continuous seal. One well-known threaded premium connection is commonly referred to as the Hydril "CS" connection, which was developed by Hydril Company and is described in U.S. Pat. No. 3,100,656. Another such threaded connection is shown in U.S. Pat. No. 3,185,502. These premium threads are most often employed to establish an interconnection between abutting oil well pipe or tubing members to prevent leakage through the interconnected box and pin members.

Conventional use of premium threaded connections and of elastomeric O-ring seals to form a fluid tight connection between box and pin members does, however, necessitate certain compromises. The wall thickness for abutting box and pin tubular members will of necessity be greater when these prior art fluid tight connections are employed than when a conventional non-sealing threaded profile is used. This invention overcomes these dimensional limitations by employing a separate plastically deformable metallic ring to establish the metal-to-metal seal during rotational engagement but independent of the profile of conventional threaded connections.

Plastically deformed circular rings have been used to form a seal between members employed for the transmission of oil and/or gas. One example is the use of a circular ring or ring-joint gasket to form a metal-to-metal seal for flanged wellheads. These flanged wellheads can be constructed according to publications of the American Petroleum Institute including the API Specification for Wellhead Equipment, API Spec. 6A, Thirteenth Edition, 1981. These flanged wellheads employ a circular metallic ring trapped in a groove on one of two mating members. These API flanged wellheads are assembled by bolting the two mating non-rotating members together. During mating the metallic rings are plastically deformed to some extent and engage both of the mating members, but there is no relative rotation between mating members.

SUMMARY OF THE INVENTION

A tubular metallic joint for use in subterranean oil or gas wells is disclosed. The tubular metallic joint in the preferred embodiment is formed between a pair of interengagable threaded box and pin members each of which have radially transversely extending abutting surfaces engaging the opposite member. In the preferred embodiment an annular axially facing groove is machined in the transversely extending terminal end of the pin member. This groove is generally V-shaped in configuration. A circular metallic ring which is more ductile than either the box or the pin members has the same mean diameter as the annular groove and this metallic ring is plastically deformed during rotational engagement of the box and pin members. As the box and pin members are threaded together the ring member is received within the groove formed on the pin terminal end. In the preferred embodiment the ring has a rectangular cross-section and the groove has a V-shaped cross-section. The volume of the groove is greater than the volume of the ring member and the plastically deformed ring member is received within the groove and forms continuous metallic sealing surfaces between one face of the V-shaped groove on the pin member and with the radially extending abutting surface of the box member. A similar ring member is employed as a set down seal in an anchor seal assembly latched in the bore of a conventional packer. This ring is retained within a groove on the bottom sub of the anchor seal assembly. The bottom sub is plastically deformed to retain the ring in the downwardly axially facing groove and set down weight applied to the anchor seal assembly causes the set down ring to engage a transversely extending surface on the packer. The soft metallic ring thus forms a metal-to-metal seal with both the bottom sub of the anchor seal assembly and with the transverse surface on the inner bore of the conventional packer.

DESCRIPTION OF THE PREFERRED EMBODIMENTS

Figure 1A:
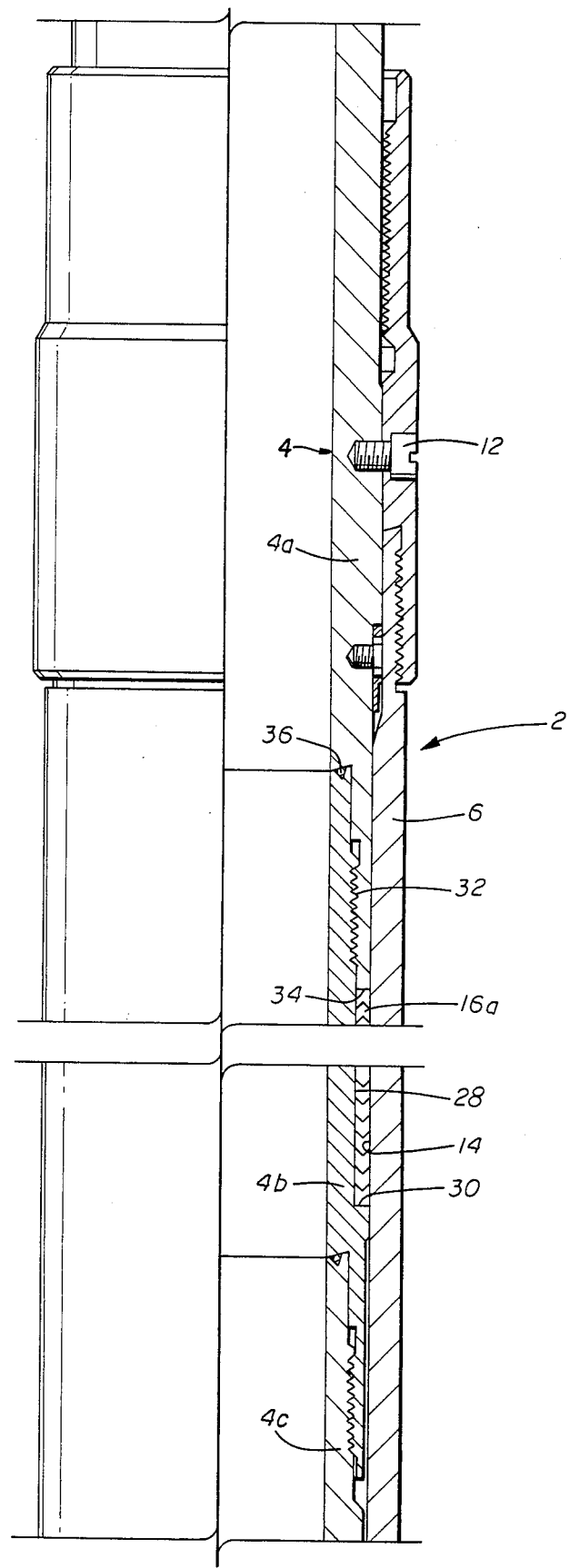
FIGS. 1A through 1C are longitudinal continuations illustrating the shear released expansion joint, the anchor seal assembly and the top portions of a packer.
Figure 1B:
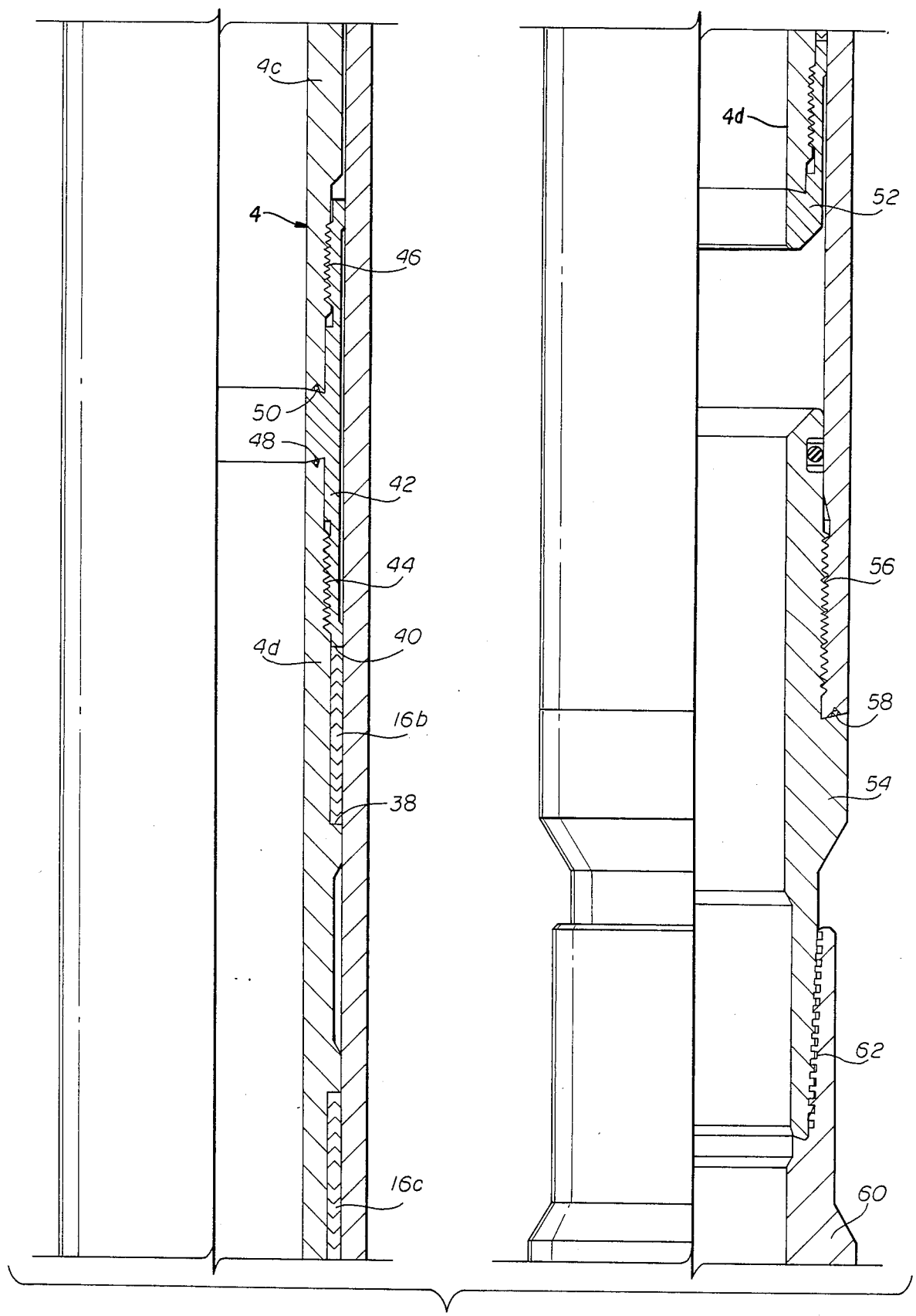
Figure 1C:
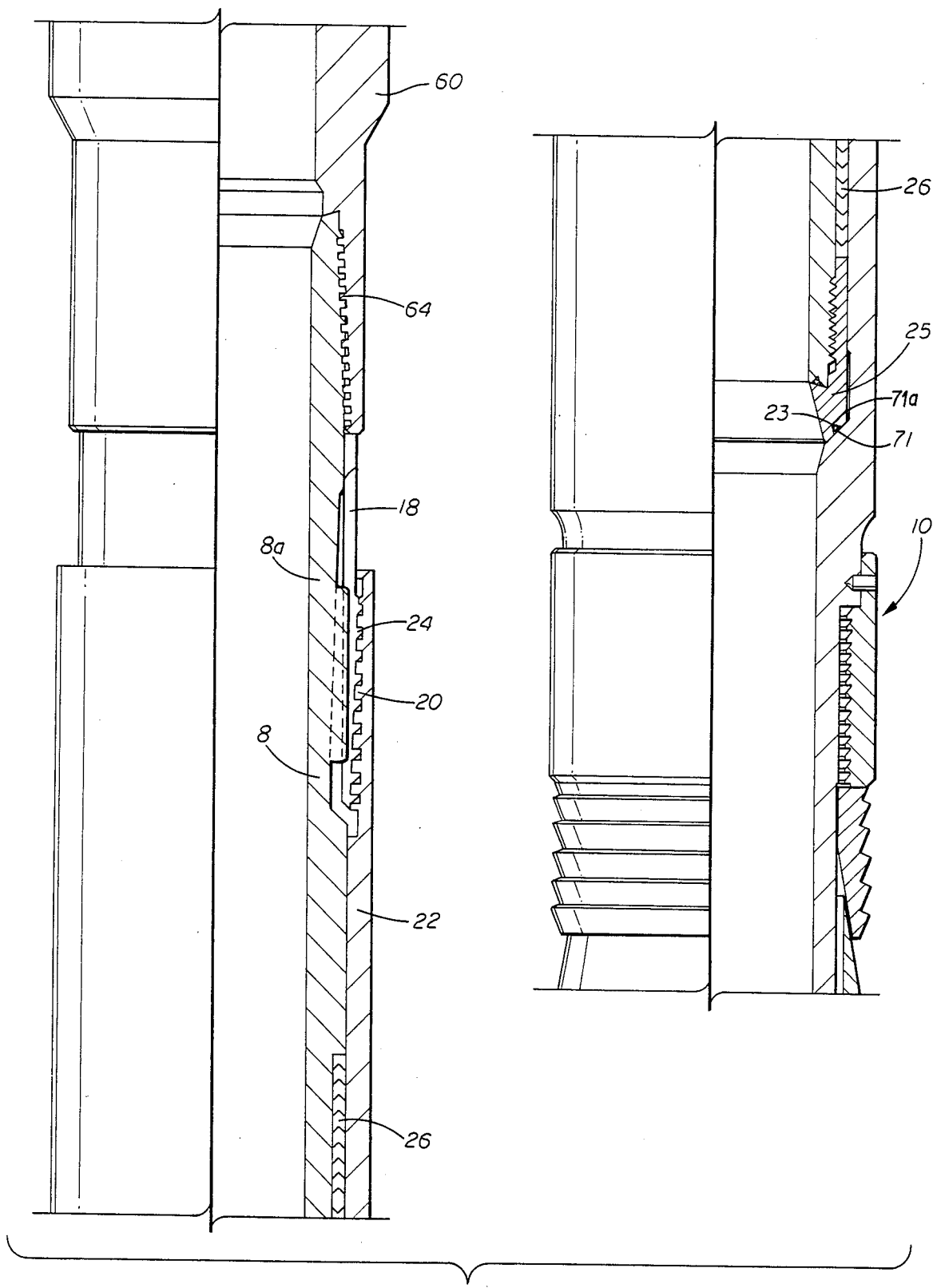

The metal plastically deformed sealing members which comprise the preferred embodiment of this invention are depicted as components of a shear release expansion joint assembly described herein. This shear release expansion joint assembly 2 comprises an inner threadably connected assembly mandrel 4 comprising an upper member 4a, intermediate member 4b, a lower member 4c, and a lowermost member 4d, and an outer polished bore receptacle attached to an anchor seal assembly 8. Anchor seal assembly 8 is received within a conventional packer 10. The upper inner mandrel 4a is attached by means of a conventional threaded connection (not shown) to a portion of the tubing extending above the shear release expansion joint assembly 2. When inserted into the well in the configuration shown in FIGS. 1A through 1C, the inner mandrel assembly 4 is attached to the outer polished bore receptacle 6 by means of shear screws 12. These shear screws are of sufficient strength to permit the expansion joint assembly to be lowered into the well and positioned relative to packer 10. If these shear screws are subjected to a prescribed shear force they will be severed and inner mandrel assembly 4 will be free to float with respect to polished bore receptacle 6. Polished bore receptacle 6 has an inner sealing surface 14 along which sealing integrity can be established by means of seals 16a, 16b, and 16c located on various portions of the inner mandrel assembly 4. In the embodiments shown herein the seal assemblies comprise chevron shaped sealing elements. These sealing elements can be conventional elastomeric sealing elements or can comprise sealing elements formed from a material or materials relatively insensitive to high temperatures and pressures and to the presence of corrosive gases or fluids such as H₂S. Adjacent its lower end a the outer polished bore receptacle 6 is attached to an anchor seal assembly 8 by means of a number of threaded connections which will be subsequently described in more detail. A conventional radially resilient anchor latch 18 is shown in engagement with the square threads 20 adjacent the upper end of packer body 22. Threads 24 on latch 18 engage square packer threads 20 in a conventional manner. The anchor seal assembly 8 and the polished bore receptacle are thus affixed to packer 10. Anchor seal assembly 8 also has conventional chevron seals 26 for establishing sealing integrity along the inner bore of packer body 22. These conventional seals 26 can be of similar construction to the seals 16a, 16b and 16c on mandrel assembly 4.

Conventional chevron seal stacks comprise a plurality of generally chevron shaped annular members positioned in tandem relationship positioned to provide sealing integrity between concentric tubular members. For example, the upper chevron seal stack 16a is positioned on the exterior of inner intermediate mandrel member 4b and engages the inner seal bore surface 14 of polished bore receptacle 6. Chevron stack 16a is positioned circumferentially around inner intermediate mandrel member 4b in a longitudinally extending recessed surface 28 located on the exterior of inner mandrel member 4b. At the lower end of inner intermediate mandrel member 4b is a seal retaining shoulder 30. There is no similar seal retaining shoulder located at the upper end of inner intermediate mandrel member 4b and the annular chevron seal members can be inserted over the upper end of member 4b prior to assembly of the mandrel. Intermediate mandrel member 4b does, however, engage upper inner mandrel member 4a by means of a conventional threaded connection 32 such as, for example, a stub acme thread profile. A lower shoulder 34 located on inner upper mandrel member 4a abuts chevron stack 16a at its upper end and below threaded connection 32. The engagement between upper inner mandrel member 4a and intermediate mandrel member 4b is by means of a conventional box and pin configuration with upper mandrel member 4a comprising the box and intermediate member 4b comprising the pin. A mating box and pin surface 36 inclined relative to the tubular axis is defined inwardly of and above threaded connection 32. The mating threads are of course defined on the mating axially extending portions of the box and pin members. A similar configuration is shown on lowermost inner mandrel 4d where chevron stack 16b abuts lower shoulder 38 and upper shoulder 40 on seal retaining joint 42. Again a conventional threaded connection 44 is located between lowermost inner mandrel member 4d and the seal retainer joint 42. Note that seal retainer member 42 is similiarly engaged with lower inner mandrel member 4c at its upper end by means of threaded connection 46. Again conventional box and pin mating surfaces 48 and 50 are formed between inner mandrel members 4d and 4c and seal retainer 42 respectively. Inner lowermost mandrel member 4d terminates with a seal retainer sub 52 located below a third conventional chevron stack 16c.

The outer polished bore receptacle 6 extends below the terminal end of inner mandrel assembly 4 and is attached to anchor seal assembly 8 by means of a series of threaded connections. Polished bore receptacle 6 is first attached to a crossover member 54 by means of a conventional threaded connection 56 again defining a conventional pin and box mating surface 58. An additional crossover member 60 engages member 54 by means of a special threaded connection 62, often referred to as a premium threaded connection which has a thread contour permitting the establishment of a metal-to-metal, fluid tight seal. A similar premium threaded connection 64 is located at the opposite end of intermediate member 60 and provides an interconnection with the anchor seal mandrel 8a. Numerous metal-to-metal fluid tight premium threaded connections are used to interconnect downhole tubular members. In general, these threaded connections have been considered proprietary. Examples of these premium threaded connections are one commonly referred to as a "VAM" threaded connection developed by Vallourec, S. A., and the Hydril "CS" threads described in U.S. Pat. No. 3,100,656. Although these premium threads provide an adequate fluid tight seal for many applications, these thread profiles do require greater wall thickness than would be necessary for a comparable conventional thread. The relative sizes of the premium thread connections 62 and 64 in comparison to conventional threaded connections such as 32 illustrates this limitation of premium fluid tight threads.

Not only must a fluid tight metal-to-metal seal be established at threaded connection 62 and 64 but fluid tight connections must be established at the interconnections between segments 4a, 4b, 4c and 4d of the inner mandrel assembly. The absence of a fluid tight connection between these three metallic members could leave a leak path through which fluid could pass through inner mandrel assembly 4 past chevron seals 16 and to the annulus, thus defeating the purpose of the sealed expansion joint. It is apparent, however, that the premium thread connections utilized at 62 and 64 could not be employed at, for example, to establish the interconection between upper and intermediate inner mandrel segments 4a and 4b. A comparison of the two interconnections shows that the premium threads depicted herein could not be used to interconnect mandrel segments 4a and 4b because of the lack of sufficient wall thickness.

Figure 2:
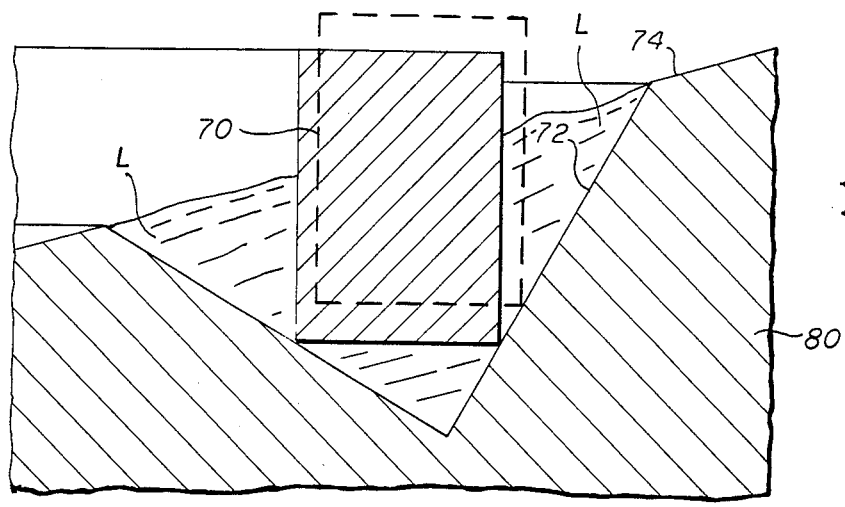
FIG. 2 is an enlarged longitudinal sectional view showing the undeformed metal sealing ring positioned within a groove on one of the two tubular members.
Figure 3:
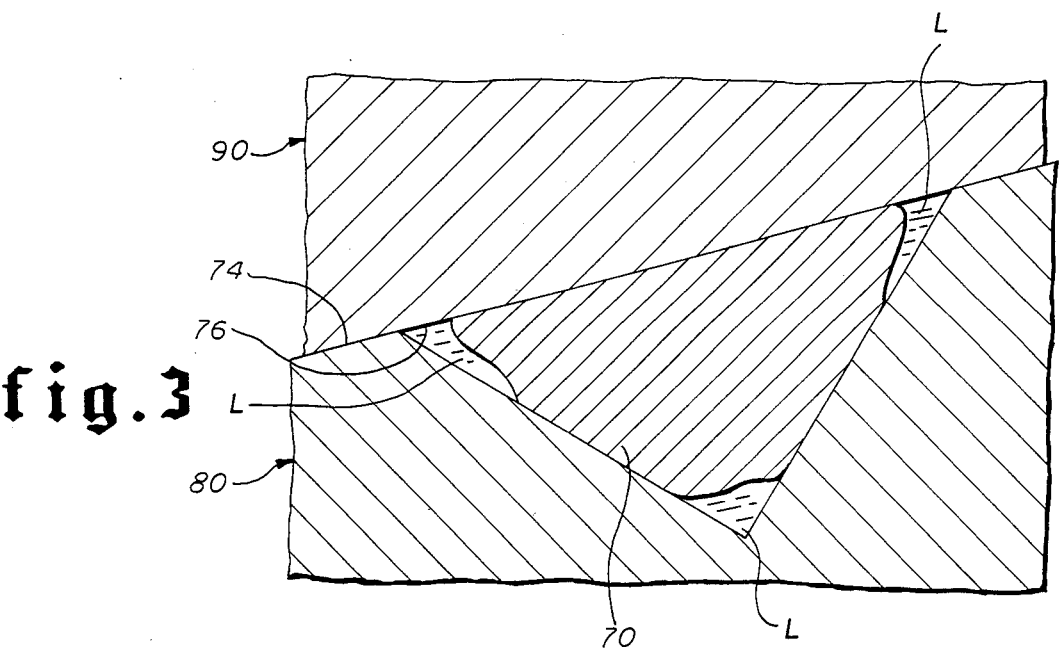
FIG. 3 is also an enlarged sectional view showing the deformation which occurs to the individual metal sealing members as two tubular members are made up.
Figure 4:
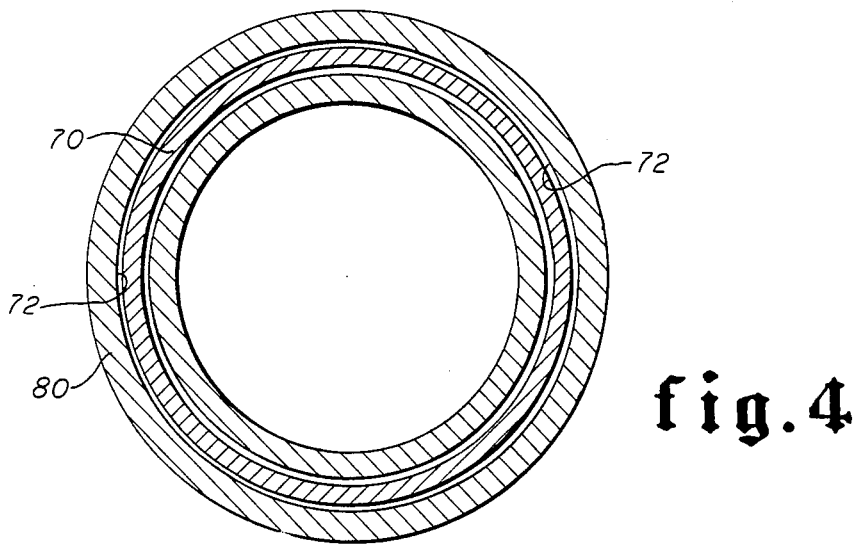
FIG. 4 is an enlarged cross-sectional view showing the positioning of an undeformed ring in a corresponding groove.

The means of establishing a fluid tight metal-to-metal seal employed herein is adaptable to a much thinner wall thickness than could be obtained utilizing conventional premium threads. Furthermore more sizes are available for straight threads than for premium threads. FIGS. 2 and 3 each constitute an enlarged view in the vicinity of the abutment of the radially extending terminal end of pin member and the radially extending surface of a mating box member. Pin member 80 has an annular groove 72 cut into its radially extending terminal end surface 74. As shown in FIG. 2 annular groove 72 is V-shaped and a line bisecting the apex of this annular groove will be perpendicular to the terminal end surface 74 of the pin member which is in turn inclined relative to the tubular axis. An annular ring 70 having the same mean diameter as its cooperating groove, is shown positioned within groove 72. Annular ring 70 is a continuous metallic circular ring and in the preferred embodiment of this invention annular ring 70 has a generally rectangular cross-section. The volume of annular ring 70 in the embodiment of this invention will be equal to approximately eighty percent (80%) of the volume defined by annular groove 72. In order to hold annular ring 70 in position within groove 72 a viscous grease or lubricant L can be applied around the ring. This viscous grease would also serve to lubricate the box and pin members when they are rotationally made up. It is apparent from FIG. 2 that ring 70 which is aligned with the axis of the tubular members is inclined relative to the abutting faces 74 and 76 and with respect to a line bisecting the apex 73 of groove 72. Initial abutment of the crush ring is shown by the dotted lines in FIG. 2. As the threaded engagement between the two members is begun, the crush ring 70 engages the groove 70 on both sides of the apex 73. Edges of undeformed ring 70 abut surfaces on opposite sides of the apex of groove 72 with one edge being closer to the apex 73 than the other abutting edge.

In order to establish a metal-to-metal seal contemplated by this invention box member 90 is rotationally made up relative to pin member 80 resulting in the plastic deformation of the annular ring 70 within groove 72. This plastic deformation occurs during rotation of the respective box and pin members. When the box and pin members are fully engaged with generally radial faces 74 and 76 abutting the annular sealing ring will be plastically deformed as shown in FIG. 3. This plastically deformed ring 70 will then be in close contact with the generally radially extending surface 76 of box member 90 and with the two sides of the annular groove in pin member 80. Note that use of a ring having a volume less than the volume of groove 72 permits plastic deformation of ring 70 without any flash extended beyond the groove 72 and between the mating surfaces of the box and pin members.

A fluid tight seal is established by the rotational deformation of the crush ring 70 by employing a more ductile crush ring material than is employed in the box and pin tubular members. As used herein, a more ductile material is synonymous with a softer material. The stresses generated by rotational engagement of the tubular members will result in plastic deformation of the crush ring since these stresses exceed the yield point. The stresses generated in the threaded members will not exceed the yield point of that material. For example, a ductile iron having a yield stress of approximately 53,000 psi can be employed with heat treated steel tubular members having a Rockwell "C" hardness of between 30 and 36 without encountering any galling problems during the rotational threading of the box and pin members and the consequent plastic deformation of the crush ring metallic seal member 70.

The fluid tight metal-to-metal seal employed in this shear release expansion joint assembly can be employed in other downhole configurations in which two tubular members are rotationally threaded. For example, these crush ring seals could be used to provide a fluid tight metal-to-metal seal between tubular components of a downhole tool such as a safety valve or a packer. These plastically deformed metallic seals could also be used to form a fluid tight seal at the coupling between tubular members forming elements of a downhole tubing string.

In addition to the fluid tight metal-to-metal seal formed by use of this crush ring in a new threaded connection, the crush ring and its companion groove can be used to restore the integrity of a threaded connection which has deteriorated and has lost its sealing integrity. The performance of a premium threaded connection with a sealing thread profile can be restored by machining a groove 72 in the radial end face of the threaded member. A crush ring can then be inserted into the groove, and when the threads are made up, the plastically deformed rings establish a fluid tight sealing connection. This repair requires only relatively simple machining operations which could be performed in the vicinity of the well site thus permitting quick reuse of tubular threaded members.

A similar circular metallic ring 71 is employed on anchor seal assembly 8. Set down ring 71 is mounted in a companion groove 23 extending circumferentially around the base of anchor seal bottom sub 25. Set down ring 71 is similarly formed of a metal having greater ductility than the set down sub or the bore of packer body 22. Ring 71 is initially inserted into groove 23 which initially correspond to the shape of the ring. To hold ring 71 in place, sub 23 is deformed by crimping or swaging the cylindrical lip 71a located on the interior of ring 71 into snug engagement with the apex of groove 23 to grip the ring and prevent it from dislodging. When weight is transmitted through anchor seal assembly 8 and to sub 25 the ring 71 engages an inclined surface on the inner bore of the packer body. A metal-to-metal seal is thus formed between the anchor seal assembly 8 and the packer body 22 to provide sealing integrity in addition to that established by polymeric seal 26.

Although the invention has been described in terms of a specific embodiments which are set forth in detail, it should be understood that this is by illustration only and that the invention is not necessarily limited thereto. Alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. In a tubular metallic joint for use in a subterranean well, a pair of interengagable threaded elements comprising a box member and a pin member; said box member having a threaded axially extending cylindrical portion and a radially extending surface; said pin member having a threaded axially extending cylindrical portion and a radially extending terminal end; an axially facing annular groove of V-shaped cross-section in one of said radially extending surface on said box member and said radially extending terminal end of said pin member extending circumferentially around said threaded joint; and a circular ring member having the same mean diameter as said groove and comprising a metallic member more ductile than said box and pin members, said ring member when undeformed having a rectangular cross-section and being partially received in said groove and being plastically deformed within said groove between the radially extending terminal end of said pin member and said radially extending surface on said box member as said box and pin members are rotationally threadably engaged to form a metal-to-metal fluid tight seal between said box and pin members the volume of said ring member being about eighty percent of the recessed volume of said groove; said radially extending surface on said box member and said radially extending terminal end of said pin member being inclined relative to a plane extending normal to the axis of the joint; and a line bisecting the apex of said groove is perpendicular to said radially extending terminal end of said pin member, said radially extending surface on said box member and said radially terminal end of said pin member being in abutment when the box and pin member are fully engaged.

* * * * *